United States Patent [19]

Christensen et al.

[11] 4,400,898
[45] Aug. 30, 1983

[54] BUCKET PIVOT ASSEMBLY

[75] Inventors: Robert B. Christensen, Kenosha, Wis.; Lee F. Kramer, Gurnee, Ill.

[73] Assignee: Dresser Industries, Inc., Dallas, Tex.

[21] Appl. No.: 292,454

[22] Filed: Aug. 13, 1981

[51] Int. Cl.³ .......................... E02F 3/00; F16C 11/02
[52] U.S. Cl. ................................. 37/118 A; 403/157; 403/158; 414/723
[58] Field of Search .................. 37/103, 117.5, 118 R, 37/118 A; 414/723, 715; 403/60, 154, 157, 158

[56] References Cited

U.S. PATENT DOCUMENTS

| 3,543,863 | 12/1970 | Ball et al. | 414/723 |
| 3,990,595 | 11/1976 | Cobb et al. | 414/723 |
| 4,096,957 | 6/1978 | Iverson et al. | 414/723 X |
| 4,133,121 | 1/1979 | Hemphill | 37/118 R |
| 4,210,405 | 7/1980 | Jesswein | 403/158 |
| 4,243,341 | 1/1981 | Kabay et al. | 403/158 |
| 4,251,182 | 2/1981 | Schroeder | 414/723 |
| 4,295,287 | 10/1981 | Natzke et al. | 37/118 R |

FOREIGN PATENT DOCUMENTS 1222056  2/1971  United Kingdom ............ 37/118 R

Primary Examiner—E. H. Eickholt
Attorney, Agent, or Firm—B. E. Deutsch

[57] ABSTRACT

A pivot assembly for mounting a bucket to a loader arm wherein shouldered pin adapters having a pin bore are tack welded in the bucket brackets so that when pounding occurs between the pin and pin bore, the pin adapter can be replaced to provide a new pin bore. The pin adapters are located on the interior sides of the bucket brackets and the external corner is indented to define a seal groove which provides an additional seal between the loader arm and the pivot pin.

3 Claims, 2 Drawing Figures

U.S. Patent
Aug. 30, 1983
4,400,898

BUCKET PIVOT ASSEMBLY

BACKGROUND OF THE INVENTION AND THE PRIOR ART

This invention relates to earth-working machines having loader buckets mounted at the end of their loader arm assemblies and, more particularly, to a pivot assembly for mounting the loader bucket for rotation about the end of the loader arm.

Loader buckets for earth-working machinery commonly have vertical plate-like bucket brackets integral therewith on the back side which receive a transverse pin mounted through the end of a loader arm to provide rotational motion thereabout. Typically, the pin is restrained from rotation relative to the bucket brackets as shown, for example, in Iverson et al. U.S. Pat. No. 4,096,957, to eliminate rotational wear between the pins and the brackets.

Nevertheless, even though the pin is restrained, the impact loading associated with earth-working buckets eventually causes the pin bores in the brackets to become pounded or wallowed out by the pin. Excess clearance between the pin and pin bore, as a result of manufacturing tolerances or of previous pounding, accentuates this problem and leads to loose pivots and still more severe impact loads and ultimately to failure of the bucket brackets. Others, such as the aforementioned Iverson et al. patent, have welded reinforcing rings alongside the bracket pin bores to reduce pounding. But when pounding out occurs, the pin bore in the bracket is still pounded out as well as the reinforcing rings. Moreover, it is difficult to renew the pin bore surfaces in the field because of the need to maintain axial alignment of the pin bores in each bracket.

SUMMARY OF THE INVENTION

The present invention is directed to an improved pivot assembly for mounting the bucket to the loader arm which overcomes the problems described above. More specifically, the bracket apertures are made substantially larger than the pivot pin and shouldered pin adapters having a concentric pin bore are inserted in the bracket apertures and retained therein as by tack welding. Thus, when pounding occurs between the pin and pin bore, the pin adapter can be replaced to provide a new pin bore. Due to their substantially larger circumferences, the bucket bracket apertures will receive substantially less unit loading and will not themselves pound out. Thus, the pivot assembly can be serviced in the field since the original axial alignment of the bracket apertures will not have been disturbed and accordingly, the axial alignment of the pin bores will be recovered upon the insertion of new pin adapters. Additionally, the pin adapters can be of a harder material than the bracket to provide extra pin bore life.

The pin adapters of the present invention are further located on the interior sides of the bucket brackets and the external corner is indented to define a groove which receives a seal, such as a cord ring, in sealing engagement with the loader arm. This provides an additional seal beyond the primary seal conventionally disposed between the loader arm and the pivot pin.

DESCRIPTION OF THE DRAWINGS

Other features and advantages of the invention will become apparent upon reference to the following description of the preferred embodiment and upon reference to the drawings, in which.

DESCRIPTION OF THE PREFERRED EMBODIMENT

Figure 1:
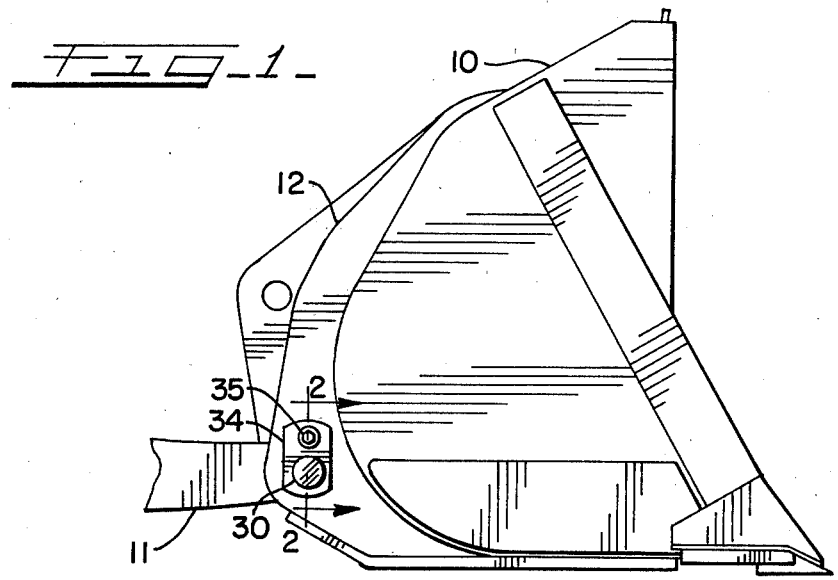
FIG. 1 is a side view of a loader bucket attached to a portion of a loader arm by the pivot assembly of the invention.

Referring to the drawings, there is shown a loader bucket 10 mounted for rotation about a loader arm 11 which is in turn mounted on an earth-working vehicle such as a tractor (not shown). The loader bucket 10 further comprises a pair of transversely spaced brackets 12, 14 which are parallel plates welded to the back side of the bucket 10 and extend vertically therealong, the loader arm 11 being received therebetween. Each of the bucket brackets 12, 14 is provided with larger apertures 15 and 16 which are substantially in axial alignment preferably by line boring. An annular shouldered pin adapter 20, preferably of a harder material than the brackets, has its smaller external diameter 21 of about the same size as the aperture 15 of the bracket 12 and is inserted therein so that the shoulder formed by larger diameter 22 of the pin adapter 20 abuts the interior side of the bracket 12. The pin adapter 20 is secured to the bracket 12 as by tack welding as shown at 24. The pin adapter 20 is further provided with a pin bore 25 concentric with the smaller diameter 21 which receives pivot pin 30 in relatively close fit. An identical pin adapter 20 is inserted in the aperture 16 of the plate 14 and tack welded thereto so that the pin bores 25 of both pin adapters 20 are in axial alignment to permit the pin 30 to extend through both pin adapters as well as the loader arm 11 therebetween.

The loader arm 11 is provided with a sleeve bearing 31 surrounding the pin 30. Primary grease seals 32 are disposed between the loader arm 11 and the pin 30 at each end of the bearing 31 to prevent the entry of dirt. A retainer plate 34 is attached as by welding to the end of the pivot pin 30 on the external side of the plate 12. The plate 34 is attached as by bolt 35 to a spacer 36 welded to the side of the plate 12. Thus, the pin 30 is prevented from rotating in the pin bores 25 or relative to the plates 12 and the bucket 10.

Figure 2:
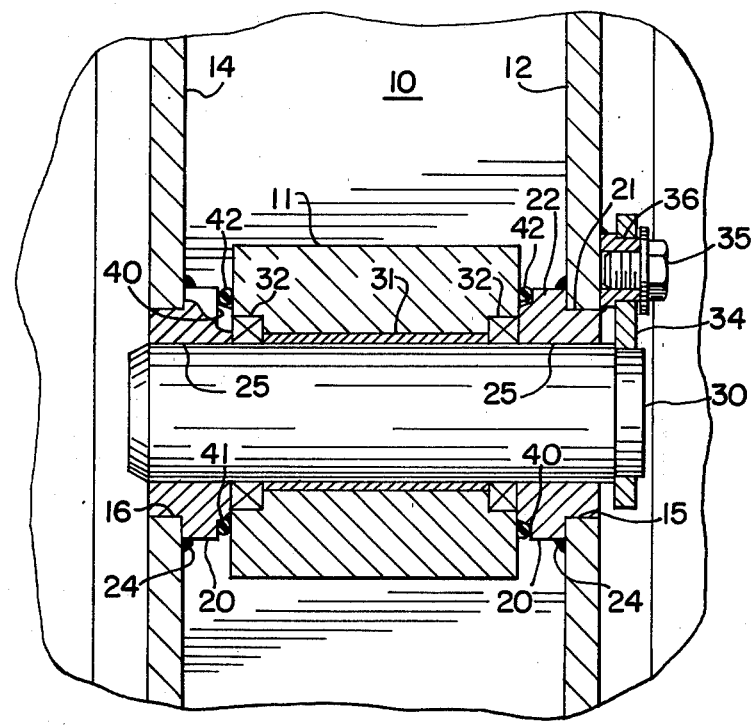
FIG. 2 is an enlarged sectional view of the pivot pin assembly shown in FIG. 1 taken along the line 2—2 thereof.

As shown on the left side of FIG. 2, the outer interior corners 40 of the pin adapters 20 are indented in a concave manner to define grooves 41 around the pin adapters 20. Received within the grooves 41, which are also partially defined by the respective sides of the loader arm 11 are secondary seals 42 of a conventional type known as a cord ring which interacts with the loader arm 11 to provide secondary sealing between the pin adapter 20 and the loader arm. This prevents larger debris from working its way into the joint and attacking the primary seals 32.

To service the pivot assembly when the pin bores are worn out, the pin 30 is removed by removing the bolt 35, thereby releasing the loader arm 11 and the cord rings 42. The pin adapters 20 are removed as by removing or breaking the tack welds 24 and new pin adpaters 20 are inserted. Since the apertures 15 and 16 in the brackets 12 and 14 will not have been pounded out to any significant degree, inserting the pin adapters 20 will produce new pin bores 25 which will be in axial alignment. The loader arm may be positioned between the brackets 12 and 14 and the pivot pin 30, or a new one if necessary, reinstalled along with the cord rings 42 and the joint is ready for further operation.

Thus, there has been provided in accordance with the invention, a bucket pivot assembly which fully meets the objects and advantages described above, especially that of serviceability in the field. It is also noted that the increased transverse thickness of the pin adapters over that of the brackets, increases the working surface of the pin bore and combined with the harder material used reduces the tendency of the pin bores to pound out.

What is claimed is:

1. In a loader bucket mounted for rotation about a loader arm assembly of an earth-working vehicle, means for mounting the bucket to the loader arm comprising:
    a pair of transversely spaced plate-like brackets secured to the bucket in vertical orientation on either side of the loader arm and having axially aligned apertures respectively transverse of the bucket;
    a pair of externally shouldered annular pin adapters welded respectively to each of said brackets and being disposed between said brackets and adjacent said loader arm, each of said pin adapters having a lesser outside diameter portion of substantially the same diameter as and mounted in the respective bracket apertures, a larger diameter portion abutting the bracket, and a transversely extending pin bore of greater axial length than said aperture, said larger diameter portion of said pin adapter having a concave indentation on the outer interior corner of said adapter, and a seal means interacting with said loader arm disposed in said indentation; and
    a cylindrical pin mounted in non-rotating relationship in said pin bore of each of said pin adapters and extending through said loader arm assembly between said brackets.

2. The invention in accordance with claim 1 and a second seal means disposed between the loader arm and the pin.

3. In a loader bucket mounted for rotation to a loader arm of an earth-working machine, a pivot assembly for mounting the bucket comprising:
    a pair of transversely spaced plate-like mounting brackets welded to said bucket, each plate having an aperture in axial alignment with the aperture in the other plate;
    a pair of pin adapters welded respectively to each bracket, the exterior portion of said pin adapters being shouldered with a smaller diameter fitting said bracket apertures and a larger diameter portion abutting the interior side of said bracket, said pin adapters further having pin bores concentric with said apertures and in axial alignment;
    a pin extending sequentially through the pin bore of one of said pin adapters, said loader arm, and the pin bore of the other of said adapters,
    means for preventing said pin from rotating relative to the bucket; and
    primary seals disposed between said pin and said loader arm, said pin adapters having indented outer corners adjacent the loader arm which define a secondary seal receiving groove and a seal disposed in said groove in sealing engagement with said loader arm.

* * * * *